M. A. BAKEWELL.
CONSUMER'S SHOPPING GUIDE.
APPLICATION FILED JUNE 12, 1916.

1,236,136. Patented Aug. 7, 1917.

SHOES

141 American  *Dodge Bros.* - New York
142 Baker-Vauter  *C.H. Baker* - Los Angeles, Cal.
143 Blue-Blood  *A.P. Smith Co.* - Chicago, Ill.
144 Cousin  *Omaha Shoe Co.* - Omaha, Neb.
145 Coward  *Foreward Shoe Co.* - Dayton, O.
146 Delmonte  *Jones & Sons* - Denver, Colo.
147 Douglas  *W.L. Douglas* - New York
148 Eagle  *Eagle Shoe House* - Chicago, Ill.
149 Emerald  *National Shoe Co.* - St. Louis, Mo.

STOVES

150 A.B.C. Ranges  *Pioneer Mfg. Co.* New York
151 Anderson  *R.P. Anderson Co.* - Atlanta, Ga.
152 Buck  *Buckeye Stove Co.* Chicago, Ill.
153 Bestever  *Smith Bros.* Milwaukee, Wis.
154 Caxston  *C.R. Caxston* - Racine, Wis.
155 Superior  *Omaha Mfg. Co.* Omaha, Neb.
156 Thames  *New Haven Stove Co.* New Haven, C.
157 Yale  *New Era Stove Co.* New Haven, Conn.
158 Zelda  *Perfection Mfg. Co.* - Albany, N.Y.

TRUNKS

159 Griffon Wardrobe  *Griffon Co.* Los Angeles
160 Indestructo  *Trunkdom Co.* New York

UNDERWEAR

161 Athena  *Parks Knitting Co.* Chicago, Ill.
162 B.V.D.  *B.V.D. Underwear Co.* New York
163 Close-fit  *Cooper Bros.* Newhall, N.Y.
164 Coopers  *Cooper Bros.* Newhall, N.Y.
165 Del-Park  *Crosby & Sons* Denver, Colo.
166 Phoenix  *American Mfg. Co.* Newark, Mass.

PAGE 28

*Fig. 1.*

LOS ANGELES

141 *Globe Department Store*
   Main and Eighth Sts.

142 *Bullocks*
   Broadway and Seventh
   *Broadway Department Store*
   Broadway and Fourth Sts.
   *Baker Shoe Company*
   122 S. Spring St.

143 *R.A. Hunter Co.*
   731 S. Broadway

144 *Bullocks*
   Broadway and Seventh
   *Hamburgers*
   Broadway and Eighth
   *Mammoth Shoe Co.*
   553 So. Broadway 145 *Robinsons*
   Grand and Seventh 146 *The Fifth Street Store*
   Broadway and Fifth
   *Innes Shoe Co.*
   524 S. Broadway 147 *The Fair*
   553 S. Main St.
   *W.R. Shaper*
   Hill and Seventh 148 *Robinsons*
   Seventh and Grand Ave.

149 *Broadway Department Store*
   Broadway and Fourth

150 *Eastern Outfitting Co.*
   Main and Seventh

PAGE 75

*Fig. 2.*

INVENTOR
*Margaret A. Bakewell*
by *Hazard Berry & Miller*
ATTYS.

UNITED STATES PATENT OFFICE.

MARGARET A. BAKEWELL, OF LOS ANGELES, CALIFORNIA.

CONSUMER'S SHOPPING-GUIDE.

1,236,136.  Specification of Letters Patent.  Patented Aug. 7, 1917.

Application filed June 12, 1916. Serial No. 103,277.

*To all whom it may concern:*

Be it known that I, MARGARET A. BAKEWELL, a citizen of the United States, residing at Los Angeles, in the county of Los Angeles and State of California, have invented new and useful Improvements in Consumers' Shopping-Guides, of which the following is a specification.

My invention relates to a directory and in particular to a shopping guide containing under proper classifications alphabetically arranged, the names or brands of various commodities as well as the names and addresses of the manufacturers of the same. The commodities listed in this directory are such as are known throughout the country and comprise well known and advertised commodities used in the home. It includes wearing apparel, furniture, cooking utensils, toilet articles, musical instruments and the like.

It is an object of this invention to devise a shopping guide containing the names of the various articles above referred to, and having each brand thereof supplied with a symbol such as a number. The directory contains, in addition to the list of the commodities and the names of the manufacturers, also a set of fly leaves containing the names and addresses of stores and business houses selling said commodities in the particular city for which the shopping guide is prepared. A number is assigned to each brand and by referring to said number in the fly leaves, one or more business houses with their addresses will be found where said articles may be purchased.

It is another object of this invention to devise a directory or consumers' shopping guide that will enable the prospective purchaser to find at once the stores in which any particular commodity may be bought.

It is another object of this invention to devise a shopping guide of the kind referred to in which the main body of the book may be used for all the several cities and in which the fly leaves only containing the names and addresses of the stores handling said commodities are different. Consequently the cost of producing the shopping guide will be greatly reduced since it is only necessary to change the fly leaves containing the names and addresses of the local merchants of the city.

With the above and other objects in view which will appear as the description proceeds, my invention consists in the arrangement and combination of parts hereinafter described and claimed.

In the accompanying drawings which form a part of this specification I have illustrated a page of the commodity index and the merchants' index in which:

Figure 1 is a sample page of the commodity index.

Fig. 2 is a sample page of the merchants' index which shows the merchants and their addresses handling goods shown on the page of the commodity index.

The various commodities used in and about the house are alphabetically arranged in the commodity index. The page shown gives the various brands of shoes, stoves, trunks and underwear. Under the heading of shoes, a number of different brands of well known makes of shoes are given, also alphabetically arranged, and numbered consecutively.

Fig. 2 illustrates a page of the merchants' index showing the numbers corresponding to numbers given under the heading of shoes in the commodity index. It will be found that 141, the number given to the make of shoes labeled American, is handled in a certain department store, giving the address of the same, and so on throughout the directory, each brand of commodity is numbered and a corresponding number appears consecutively arranged in the merchant's index and under said number, one or more business houses with their addresses are given.

Assuming that the prospective purchaser desires to buy a pair of "Cousin" shoes, the commodity index is opened at the place of "Shoes" and the brand "Cousin" is found. The number corresponding therewith is 144. Now turning to the merchants' index to 144, it will be found that this brand of shoes may be had at any one of three different stores, whose addresses are given. In this manner, the places that sell the commodities, whether it be wearing apparel or furniture, etc., may be instantly found by referring to the shopping guide as explained above.

The commodity index may in addition to the name of the brand of the commodity, also contain immediately adjacent to said name, an advertisement of the manufacturer of said commodity.

It will be apparent from the foregoing description that while a certain brand of commodity will appear but once in the commodity index, the stores selling the commodities will be repeatedly found in the merchants' index.

My arrangement of the shoppers' guide enables the manufacturer thereof to reduce the cost of the same for the reason that the same commodity index may be used without any change in the several cities throughout the United States, as it is merely necessary to change the fly leaves which give the names and addresses of the merchants selling the commodities mentioned in the commodity index.

While I have shown and described the preferred form of the shoppers' guide, it will be understood that various changes in the arrangement of the commodity index, as well as the merchants' index and the symbols used therein, may be made without departing from the spirit of my invention as defined in the appended claim.

I claim:

A shopping guide comprising a commodity index containing the names of commodities manufactured in a plurality of places and alphabetically arranged as headings, there being an alphabetically arranged group of brands of the commodity under each heading and the brands throughout the commodity index being consecutively numbered and supplied with the name and address of the manufacturer; and a merchants' index of one place containing the brand numbers consecutively arranged and giving with each number a list of the names and addresses of the local merchants handling the brand.

In testimony whereof I have signed my name to this specification.

MARGARET A. BAKEWELL.